(12) United States Patent
Gumpoltsberger et al.

(10) Patent No.: US 7,272,990 B2
(45) Date of Patent: Sep. 25, 2007

(54) POWERSPLIT LAYSHAFT TRANSMISSION WITH BEARING PLATE FOR SUPPORT OF RADIAL FORCE

(75) Inventors: Gerhard Gumpoltsberger, Friedrichshafen (DE); Michael Preuss, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 19 days.

(21) Appl. No.: 10/807,649

(22) Filed: Mar. 24, 2004

(65) Prior Publication Data

US 2004/0198545 A1   Oct. 7, 2004

(30) Foreign Application Priority Data

Apr. 4, 2003   (DE) ................ 103 15 314

(51) Int. Cl.
 *F16H 57/02*   (2006.01)
 *F16H 57/04*   (2006.01)
 *F16H 61/00*   (2006.01)
 *F16H 57/08*   (2006.01)

(52) U.S. Cl. .................... 74/606 R; 475/343
(58) Field of Classification Search ........... 74/606 R; 475/214, 343, 303
 See application file for complete search history.

(56) References Cited

U.S. PATENT DOCUMENTS

| | | | | |
|---|---|---|---|---|
| 5,284,067 A * | 2/1994 | Seaman | ............... | 74/606 R |
| 5,483,850 A | 1/1996 | Yamauchi | | |
| 5,593,358 A * | 1/1997 | Frost | ............... | 475/218 |
| 5,802,915 A * | 9/1998 | Organek et al. | ............. | 74/331 |
| 5,823,051 A * | 10/1998 | Hall, III | ............... | 74/325 |
| 6,575,056 B1 * | 6/2003 | Gnandt | ............... | 74/665 GA |
| 6,609,439 B1 * | 8/2003 | Yamaguchi | ............. | 74/606 R |
| 6,658,955 B1 * | 12/2003 | Fuhrer et al. | ............... | 74/413 |
| 6,709,356 B2 * | 3/2004 | Fuhrer et al. | ............... | 475/207 |
| 6,869,379 B2 * | 3/2005 | Voss et al. | ............... | 475/218 |

FOREIGN PATENT DOCUMENTS

| | | | |
|---|---|---|---|
| DE | 40 08 303 A1 | | 9/1990 |
| DE | 40 41 899 A1 | | 7/1991 |
| DE | 41-07 739 A1 | | 9/1991 |
| DE | 42 26 577 C1 | | 2/1994 |
| DE | 44 05 823 A1 | | 9/1994 |
| DE | 19630803 A1 | * | 2/1998 |
| DE | 198 21 164 A1 | | 11/1999 |
| DE | 198 27 581 A1 | | 12/1999 |
| DE | EP 965773 A1 | * | 12/1999 |
| DE | 19927080 A1 | * | 12/2000 |

* cited by examiner

*Primary Examiner*—Tisha Lewis
(74) *Attorney, Agent, or Firm*—Davis Bujold & Daniels, P.L.L.C.

(57) ABSTRACT

An automatic multiple-gear transmission, in particular a power-bifurcated auxiliary transmission for motor vehicles, is described, in which several power paths are provided in a transmission housing (24) between a transmission input shaft (3) and a transmission output shaft (4) for the shifting of gears. The gears are presented with several conversion devices (8, 9, 10) that can be hooked up via control elements (5, 6, 7) into a power flow. At least one of the conversion devices (8, 9, 10) is located at least partially in a transmission housing (24) in such a way that the radial and tangential forces can be transmitted directly to the housing when the conversion device (8, 9) is hooked up.

6 Claims, 2 Drawing Sheets

POWERSPLIT LAYSHAFT TRANSMISSION WITH BEARING PLATE FOR SUPPORT OF RADIAL FORCE

Figure 1:
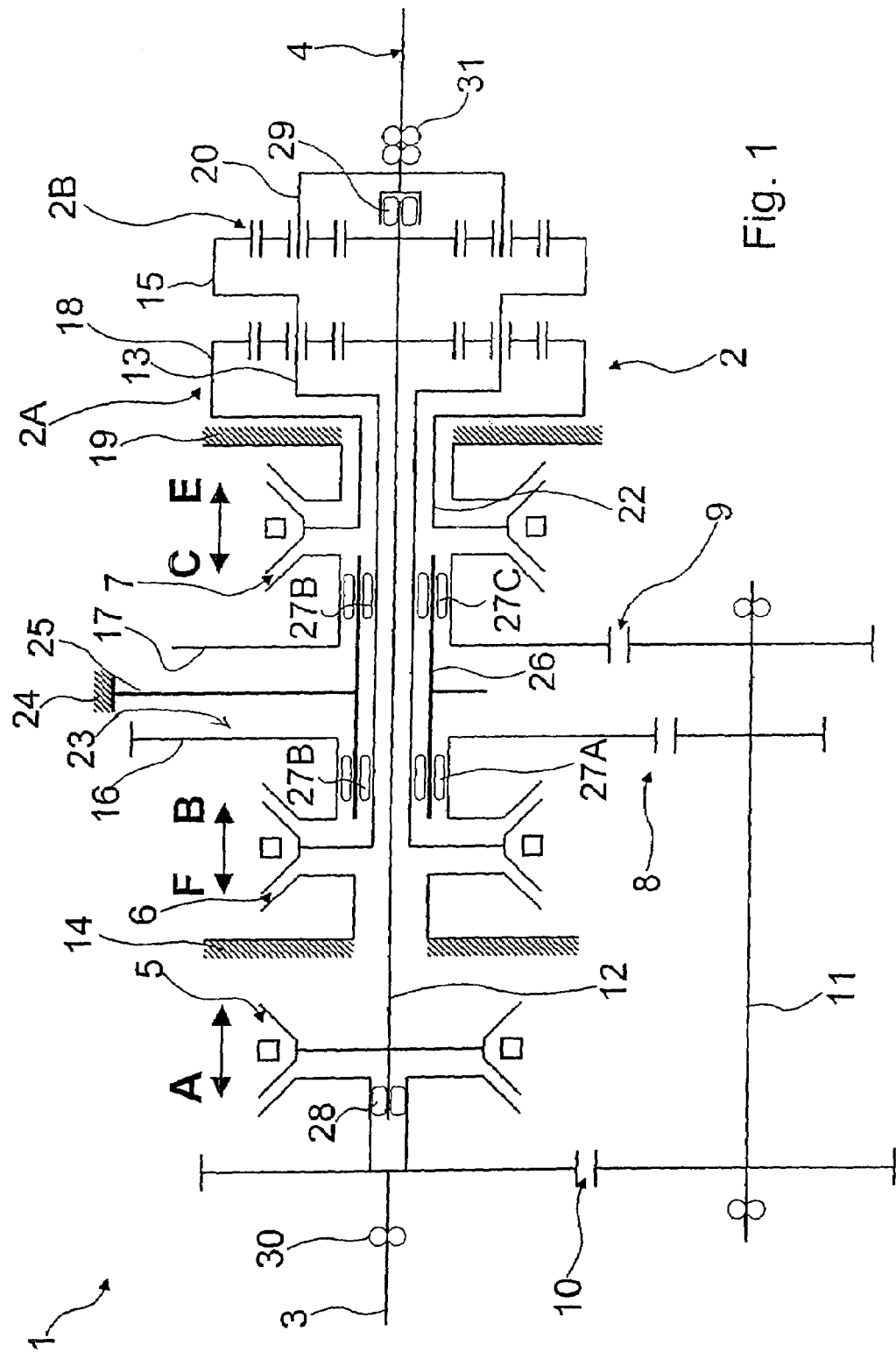

This application claims priority from German Application Serial No. 103 15 314.4 filed Apr. 4, 2003.

FIELD OF THE INVENTION

The invention concerns an automatic multiple-gear transmission.

BACKGROUND OF THE INVENTION

Automatic transmissions or multiple-gear transmissions, which are generally known in the art, are predominantly based upon the principle of conventional manual transmissions in a gear building system, in which a gear shift is realized with control elements in the form of synchronizations. Because power-producing elements in these types of transmissions, designed in the form of spur gear levels, require a large installation space, in practice so-called automatic power shift gears with planetary gear sets are used. These require less installation space in comparison with transmissions comprising spur gear levels.

Automatic power shift gears, however, are designed with control elements, such as frictional multiple disk clutches and multiple disk breaks, that must have relatively large dimensions to enable transfer of torque, and are most often actuated hydraulically.

In addition, these types of power shift gears are disadvantageously characterized by large drag losses during their inoperative state or in their open state, and a correspondingly large amount of actuation energy is required for their actuation, which has a negative effect on the transmission efficiency.

Furthermore, transmission types are known in the art that are a combination of the two previously described transmission concepts, i.e., they combine automatic multiple-gear transmissions with a gear building system and automatic power shift transmissions with planetary gearsets.

Such a combination is represented, for example, by a conventional auxiliary transmission with power bifurcation and a post-connected planetary gearset as a summing transmission. The individual gears of such a transmission are engaged via the control elements of the auxiliary transmission, wherein the control elements as well as the spur gears of the spur gear levels of the power-bifurcated auxiliary transmission are located directly on a main shaft and directly on a countershaft.

The further the control elements and the spur gears, located on the two shafts of the auxiliary transmission, are distanced from a bearing of the main shaft and from a bearing of the countershaft in a transmission housing on the main shaft and on the countershaft, the higher are the tangential, radial, and axial forces that are exerted when the spur gear levels are hooked up. These forces lead to higher or lower bending moments or bending loads of the main shaft as well as the countershaft, so that both shafts must be dimensioned accordingly to avoid damage.

If very high drive moments are transferred via the transmission, the main shaft, the countershaft, and the bearings of the two shafts must be designed with undesirably large dimensions, resulting in the disadvantage of a high total weight of the transmission and high manufacturing costs for the transmission.

It is the task of the present invention to provide an automatic multiple-gear transmission with a reduced total weight and more economical manufacturing costs in comparison with automatic multiple-gear transmissions known in the art.

SUMMARY OF THE INVENTION

An automatic multiple-gear transmission of the previously described type, in which one of the conversion devices is located at least partially in the housing in such a way that the radial- and tangential forces exerted on the conversion device when it is hooked up can be transmitted directly into the transmission housing, offers the advantageous option of dimensioning the individual power paths smaller than in automatic multiple-gear transmissions that are known in the art, because the power paths essentially only have to transmit the torsion moments.

This results advantageously from the fact that the bending moments resulting from the tangential-, radial- and, in some cases, even axial forces of the hooked-up conversion device that is at least partially located directly in the housing are accepted by the housing, and do not have to be shored up by the power paths, such as a main shaft or an auxiliary shaft or a power bifurcated auxiliary transmission.

The multiple-gear transmission, according to the invention, also has the advantage that a bearing of the shaft of a power path whose conversion device is located in the housing is less loaded due to the omission or the reduction of the bending load on the shaft and can, therefore, have smaller dimensions.

An automatic multiple-gear transmission designed, according to the invention, is characterized by a lower total weight and, therefore, lower manufacturing costs due to the lower component load of the components of the power paths and the consequentially smaller dimensioning of the components capable of accepting higher loads than the known transmissions in practice.

Additional advantages and advantageous embodiments of an automatic multiple-gear transmission, according to the invention, can be gathered from the description, the drawing and the patent claims.

Figure 2:
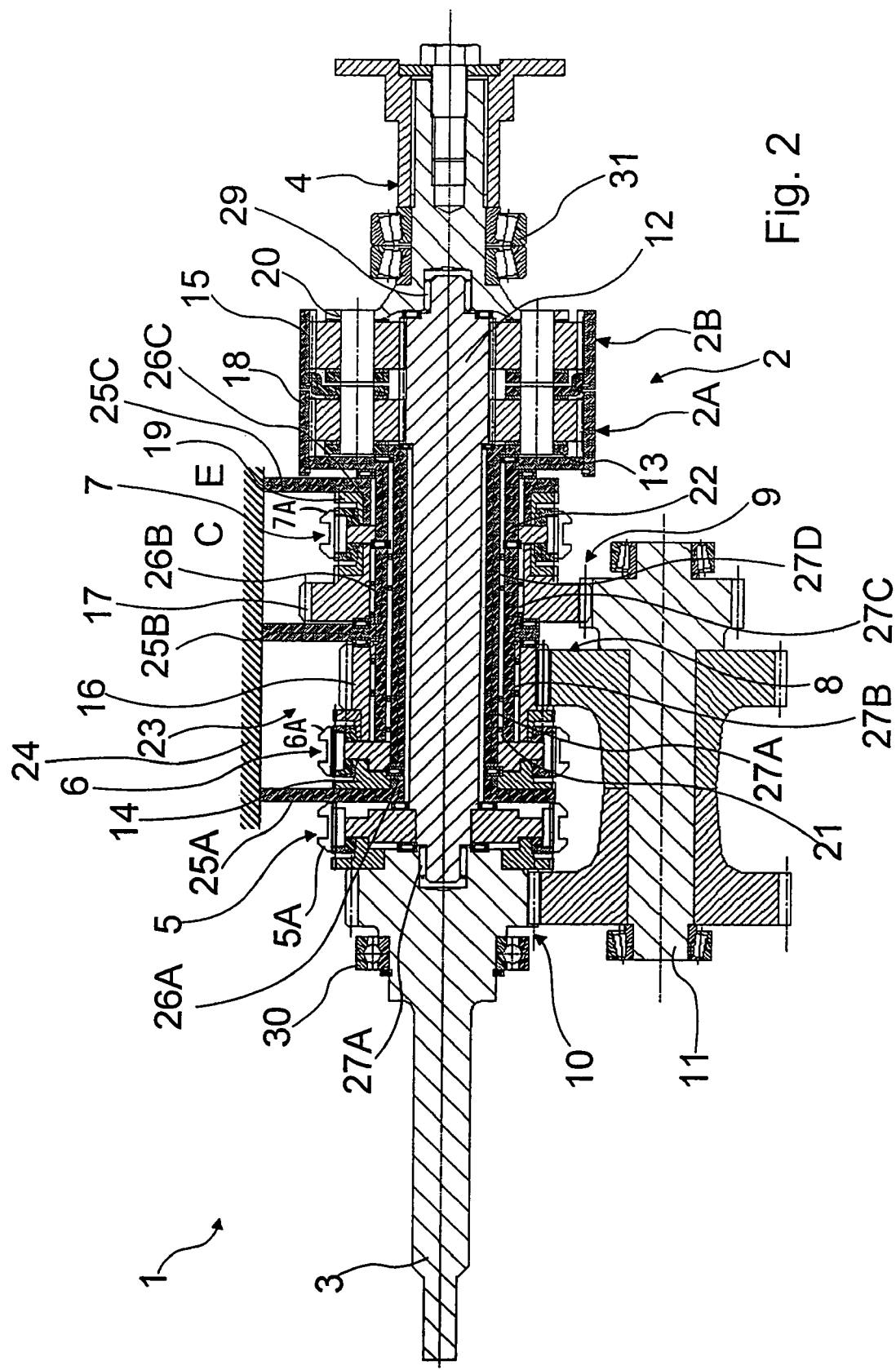

BRIEF DESCRIPTION OF THE DRAWINGS The invention will now be described, by way of example, with reference to the accompanying drawings in which:

FIG. 1 is a wheel schematic of an automatic multiple-gear transmission showing a combination of an auxiliary transmission and a post-connected planetary gearset; and FIG. 2 is a simplified view of a constructive exemplary embodiment of the automatic multiple-gear transmission, according to FIG. 1, in a partial longitudinal section.

DETAILED DESCRIPTION OF THE INVENTION

FIG. 1 shows an automatic multiple-gear transmission 1, which is designed as a power bifurcated auxiliary transmission for motor vehicles, and is combined with a post-connected planetary gearset 2 consisting of a first planetary gearset 2A and a connected planetary gearset 2B. Between a transmission input shaft 3 and a transmission output shaft 4, several power paths are provided in a housing (not shown in greater detail), for the shifting of the gears of the transmission 1, which can be shown via several control elements 5, 6, 7 in conversion devices 8, 9, 10 that can be hooked up into a power flow of the transmission 1 and the planetary gear set 2.

An abutting drive moment above the transmission input shaft 3 of a drive engine (not shown in greater detail) is transmitted via the conversion device 10, which is in the form of a spur gear toothing, to a countershaft 11, which is thus driven during the operation of the transmission 1 depending on the available drive moment. Furthermore, the drive moment is transmitted to the control element 5 via the transmission input shaft 3.

In a closed state or in the switch position "A" of the control element 5, a main shaft 12 is connected to the transmission input shaft 3 torque-free, and the drive moment is transmitted from the transmission input shaft 3 to the main shaft 12 of the transmission 1. When the control element 5 is open, the transmission input shaft 3 and the main shaft 12 are not connected to one another, and the available drive moment is not transmitted to the main shaft 12 via the control element 5.

The two control elements 6 and 7 can be placed in two different shift positions "F" and "B" or "C" and "E" where they are closed, and through them the torque can be transmitted in the direction of the transmission output shaft 4 from the transmission input shaft 3. Furthermore, each of the control elements 6 and 7 is adjustable in a central shift position (not described in detail here) in which each of them is open and no torque can be transferred.

If the control element 6 is in the "F" shift position, a web 13 of the first planetary gearset 2A is connected torque-free with a component 14 that is rigidly connected to the housing and is, therefore, held torque-free in the transmission 1. An interior gear 15 of the second planetary gearset 2B is connected to the web 13 of the first planetary gearset 2A; consequently the interior gear 15 is also positioned torque-free in the housing in the switch position "F" of the control element 6. Depending on which of the shift positions "A" or "C" and "E", the two other control elements 5 and 7 are set in, a certain conversion or a certain gear of the transmission 1 is presented.

Moreover, each of spur gears 16 and 17 of the conversion devices 8 and 9 can be connected to the web 13 of the first planetary gearset 2A or an internal gear 18 of the first planetary gearset 2A, via the control elements 6 and 7. In the shift position "E" of the control element 7, an internal gear 18 of the first planetary gearset 2A is connected torque-free to an additional component 19 that is mounted rigidly on the housing, so that said component is located torque-free in the housing of the transmission 1.

The transmission output shaft 4 is connected to a web 20 of the second planetary gearset 2B, forming the output of the transmission 1, and totaling the drive moment that is transmitted via the main shaft 12 and the countershaft 11 in a power-bifurcated fashion via the transmission 1, which is then transmitted to the transmission output shaft 4.

The control element 6 is connected, via a hollow shaft 21 that is oriented coaxially to the main shaft 12, to the web 13 of the first planetary gearset 2A. In addition, the control element 7 is connected, via another hollow shaft 22 that also is oriented coaxially to the main shaft 12, to the internal gear 18 of the first planetary gearset 2A.

The design, shown schematically in FIG. 1 of the automatic multiple-gear transmission 1, is designed in such a way that, regardless of which one of the control elements 5, 6 or 7 is hooked into the power flow of the transmission 1 for a gear presentation of the transmission 1, the operative radial- and tangential and possibly also the axial forces are directly transmitted to a transmission housing 24 of the transmission 1.

For this, the transmission is equipped with a bearing 23 that is directly connected to a transmission housing 24 of the transmission 1 or with a component that is rigidly connected to the housing. The bearing 23 is strongly schematized in FIG. 1 and is equipped with a bearing plate 25 and a bearing sleeve 26, wherein the two spur gears 16 and 17 as well as the hollow shaft 21 are located such that they can rotate above four schematically illustrated ball bearings 27A to 27D.

The design of the transmission 1 with the bearing 23 leads to the fact that the components of the transmission 1 located on the bearing 23 are not located on the main shaft 12 as is known-in-the-art transmissions. In this manner, the radial and tangential and perhaps axial forces created in the toothing of the conversion devices 8 and 9 when they are hooked up are forwarded directly into the transmission housing 24 of the transmission 1, without them having to be transmitted first to the main shaft 12 and from there via a bearing of the main shaft, into the transmission housing 24.

Thus, the option exists that the main shaft 12, which has been unburdened via the bearing 23, can have smaller dimensions, since only torsion moments are transferred via the main shaft 12 when the conversion devices 8 or 9 are hooked up. Bending moments based upon the above-described radial, tangential, and perhaps axial forces in the toothing of the hooked-up conversion devices 8 and 9 are not transferred at all by the main shaft 12.

Furthermore, a bearing of the main shaft 12, which is primarily located in the transmission input shaft 3 above a first main shaft bearing 28 and at the opposite side above a second main shaft bearing 29 in the transmission output shaft 4, is unburdened. The transmission input shaft 3, in turn, is located above a transmission input shaft bearing 30 and the transmission output shaft 4 is located above a transmission output shaft bearing 31 in the housing of the transmission 1 in a way that is not shown here in greater detail.

FIG. 2 shows a constructive embodiment of the wheel schematic of the transmission 1 shown in FIG. 1. The bearing 23 is designed presently above three bearing plates 25A, 25B and 25C rigidly connected with the housing, each of which is connected rigidly to one of the three bearing sleeves 26A, 26B and 26C, so that the bearing sleeves 26A, 26B, and 26C are arranged non-rotatably and in an axial orientation relative to the transmission in the transmission housing 24 of the transmission.

The bearing plates 25A through 25C are integrated directly into the transmission housing 24 of the transmission 1 in the embodiment shown, and are manufactured in one molding process together.

As a deviation, the bearing may also be designed as a separate component. The bearing designed as a separate component can then be pre-mounted in the housing with the main shaft prior to installation of the main shaft, and can then be inserted into the housing together with the gearsets of the conversion devices during the final installation of the transmission into the housing, at which time it can be connected rigidly with the housing via screw connections or a welding seam.

The bearing 23 itself can be designed as a single piece or can consist of several parts, i.e., individual bearing plates and individual bearing sleeves that are rigidly assembled. The bearing plates are presently designed as plane webs, which clearly position the bearing sleeves in an appropriate manner in a mounted state in the housing.

In a design of the bearing 23 with multiple parts, the bearing plates can be designed to form a single piece with the housing. The separately designed sleeves are then mounted to the bearing plates in the housing of the transmission using appropriate connection processes such as screwing or welding, prior to installation of the main shaft.

The control elements 5 through 7 are presently designed as known mechanical synchronizations via which different speeds in the transmission can be non-positively adjusted via idler wheels 5A, 6A and 7A that are adjustable in the transmission longitudinal direction, and can each be balanced when the control elements 5, 6 and 7 are hooked up.

When a synchronization is created between the main shaft 12 and the countershaft 1 during the hook-up of one of the conversion devices 8, 9 or 10, via non-positive components of the control elements, a positive connection is created between the participating components of the transmission 1 via a positive fit of the control elements 5, 6 or 7, so that the retention force for the holding of the control elements 5, 6 or 7 in a closed state can be reduced.

Of course, it is left to the discretion of the expert to replace the control elements that are designed at present as synchronizations with other appropriate control elements, such as purely non-positive multiple disk clutches and/or multiple disk brakes or purely positive control elements such as coupling disks or such, depending upon the appropriate application.

Furthermore, deviating from the design examples shown in FIG. 1 and FIG. 2 for an automatic multiple-gear transmission, according to the invention, the planetary gearset 2 may also be integrated into the auxiliary transmission in such a way that the planetary gearset is located, for example, between the two control elements 6 and 7. With such a design for the automatic multiple-gear transmission, the components, which would energize the main shaft 12 with a bending load, are located in the same way directly above the bearing 23 in the transmission housing 24.

| Reference numerals | |
|---|---|
| 1 | automatic multiple-gear transmission |
| 2 | planetary gearset |
| 2A | first planetary gearset |
| 2B | second planetary gearset |
| 3 | transmission input shaft |
| 4 | transmission output shaft |
| 5-7 | control element |
| 5A | idler wheel |
| 6A | idler wheel |
| 7A | idler wheel |
| 8 | conversion device |
| 9 | conversion device |
| 10 | conversion device |
| 11 | countershaft |
| 12 | main shaft |
| 13 | web to the first planetary gearset 2A |
| 14 | component rigidly mounted on housing |
| 15 | internal gear of the second planetary gearset 2B |
| 16 | spur gear of the first conversion device |
| 17 | spur gear of the second conversion device |
| 18 | internal gear of the first planetary gearset 2A |
| 19 | component rigidly mounted on housing |
| 20 | web to the second planetary gearset 2B |
| 21 | hollow shaft |
| 22 | additional hollow shaft |
| 23 | bearing |
| 24 | transmission housing |
| 25A-C | bearing plate |

-continued

| Reference numerals | |
|---|---|
| 26A-C | bearing sleeve |
| 27A-D | ball bearing |
| 28 | first main shaft bearing |
| 29 | second main shaft bearing |
| 30 | transmission input shaft bearing |
| 31 | transmission output shaft bearing |

The invention claimed is:

1. An automated multiple-gear transmission in which a plurality of power paths having corresponding transmission gear ratios are provided between a transmission input shaft (3) and a transmission output shaft (4) for gear shifting, the transmission comprising:

a plurality of ratio conversion devices (8, 9, 10) that can be engaged, via shifting elements (5, 6, 7), for forming the plurality of power flow paths through the transmission, at least one of the ratio conversion devices (8, 9) having a bearing sleeve (26, 26A, 26B 26C) on which at least one of the shifting elements (6, 7) is at least partially located, wherein the bearing sleeve (26, 26A, 26B 26C) is rigidly connected to a transmission housing (24) by at least one support element (25, 25A, 25B, 25C) so that radial, axial and tangential forces, affecting the at least one ratio conversion device (8, 9), are directly transmitted to the transmission housing (24) through at least one of the shifting elements (6 or 7) when the at least one ratio conversion device (8, 9) is engaged.

2. The automated multiple-gear transmission according to claim 1, wherein the conversion devices (8, 9, 10) each comprise first and second spur gears which form a spur gear pair, and the first spur gear (16, 17) is supported by a bearing (23) of the respective conversion device (8, 9) and the second spur gear is supported on a countershaft (11).

3. An automated multiple-gear transmission in which several power paths are provided, in a transmission housing (24), between a transmission input shaft (3) and a transmission output shaft (4) for gear shifting;

wherein transmission gears can be realized by several ratio conversion devices (8, 9, 10) that can be engaged for forming a power flow via shifting elements (5, 6, 7), at least one of the ratio conversion devices (8, 9) is at least partially located within the transmission housing (24) in such a way that radial and tangential forces affecting at least one of the ratio conversion device (8, 9), when the at least one ratio conversion device is engaged, are directly transmitted to the transmission housing (24);

axial forces abutting at least one of the conversion devices (8, 9) can also be transmitted directly into the transmission housing (24) via a bearing (23) of the at least one conversion device (8, 9); and the bearing (23) of the at least one conversion device (8, 9) is equipped with a bearing sleeve (26, 26A; 26B, 26C) on which at least one of the shifting elements (6, 7) is at least partially located, wherein the bearing sleeve (26; 26A, 26B, 26C) is rigidly connected to the transmission housing (24) via at least one support element (25; 25A, 25B, 25C).

4. The automated multiple-gear transmission according to claim 1, wherein each of the shifting elements (5, 6, 7) is formed as one of positive shifting elements and non-positive shifting elements.

5. The automated multiple-gear transmission according to claim 1, wherein the power paths are totaled in a summing transmission in the form of a planetary gearset (2).

6. The automated multiple-gear transmission according to claim 1, wherein the multiple-gear transmission is a power split countershaft transmission.

\* \* \* \* \*